United States Patent
Isami et al.

(10) Patent No.: US 12,420,642 B2
(45) Date of Patent: Sep. 23, 2025

(54) BATTERY ELECTRIC VEHICLE

(71) Applicant: TOYOTA JIDOSHA KABUSHIKI KAISHA, Toyota (JP)

(72) Inventors: Yoichiro Isami, Mishima (JP); Tatsuya Imamura, Okazaki (JP); Kenji Mizutani, Toyota (JP); Tsuyoshi Okada, Nagoya (JP); Naoki Yamamuro, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 18/928,872

(22) Filed: Oct. 28, 2024

(65) Prior Publication Data
US 2025/0145005 A1    May 8, 2025

(30) Foreign Application Priority Data
Nov. 8, 2023  (JP) .................. 2023-190674

(51) Int. Cl.
G06F 17/00   (2019.01)
B60L 7/14    (2006.01)

(52) U.S. Cl.
CPC ........... *B60L 7/14* (2013.01); *B60L 2240/423* (2013.01); *B60L 2250/26* (2013.01)

(58) Field of Classification Search
CPC ... B60L 7/14; B60L 2240/423; B60L 2250/26
USPC .......................................................... 701/22
See application file for complete search history.

(56) References Cited

U.S. PATENT DOCUMENTS

| | | | | |
|---|---|---|---|---|
| 6,033,041 A | * | 3/2000 | Koga | ........................ B60L 7/18 303/192 |
| 9,020,674 B2 | * | 4/2015 | Gregg | ..................... B60L 58/12 903/903 |
| 9,139,099 B2 | * | 9/2015 | Hayashi | .............. B60L 15/2009 |
| 9,387,847 B2 | * | 7/2016 | Noguchi | ................. B60L 58/12 |
| 9,566,976 B2 | * | 2/2017 | Fujishiro | ............... B60W 10/08 |
| 9,610,934 B2 | * | 4/2017 | Uchihara | .............. B60W 10/08 |
| 2008/0236912 A1 | | 10/2008 | Ueoka et al. | |
| 2014/0180518 A1 | * | 6/2014 | Hayashi | ................... B60K 6/52 701/22 |

(Continued)

FOREIGN PATENT DOCUMENTS

JP    6787507 B1   11/2020

OTHER PUBLICATIONS

Effect of Regenerative Braking on Battery Life (Year: 2023).*

*Primary Examiner* — Ronnie M Mancho
(74) *Attorney, Agent, or Firm* — Dinsmore & Shohl LLP

(57) ABSTRACT

A battery electric vehicle includes an electric motor as a driving source. The battery electric vehicle includes: a driving operation member that is used to drive the battery electric vehicle; a pseudo shifting operation member imitating an operation member that is used to perform a shifting operation of a manual transmission internal combustion engine vehicle; a processor that controls the battery electric vehicle according to operation of the driving operation member; and an in-vehicle battery that is charged with electrical energy generated when regenerative braking of the battery electric vehicle is applied. The processor executes, according to selection by a driver, a control mode in which operation of the pseudo shifting operation member is associated with torque of the electric motor.

12 Claims, 9 Drawing Sheets

(56) References Cited

U.S. PATENT DOCUMENTS

| | | |
|---|---|---|
| 2014/0195088 A1 | 7/2014 | Schuessler |
| 2015/0224981 A1* | 8/2015 | Fujishiro ................. B60L 7/18 180/65.265 |
| 2016/0059843 A1* | 3/2016 | Oguma ................ B60W 10/06 180/65.265 |
| 2021/0229550 A1 | 7/2021 | Isami |
| 2021/0387529 A1 | 12/2021 | Oh et al. |
| 2022/0063494 A1 | 3/2022 | Duo' et al. |
| 2024/0208336 A1* | 6/2024 | Isami ..................... B60L 15/20 |

* cited by examiner

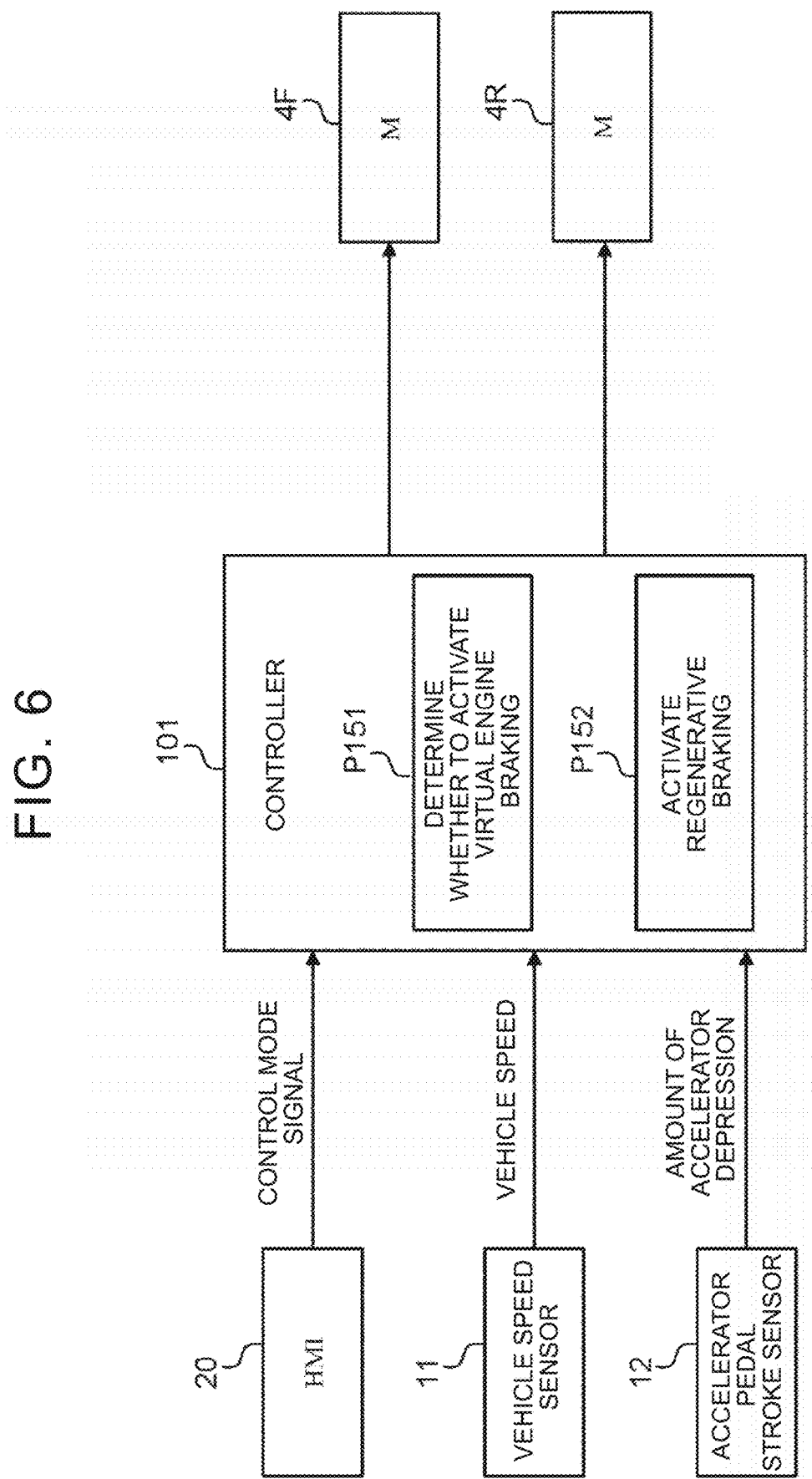

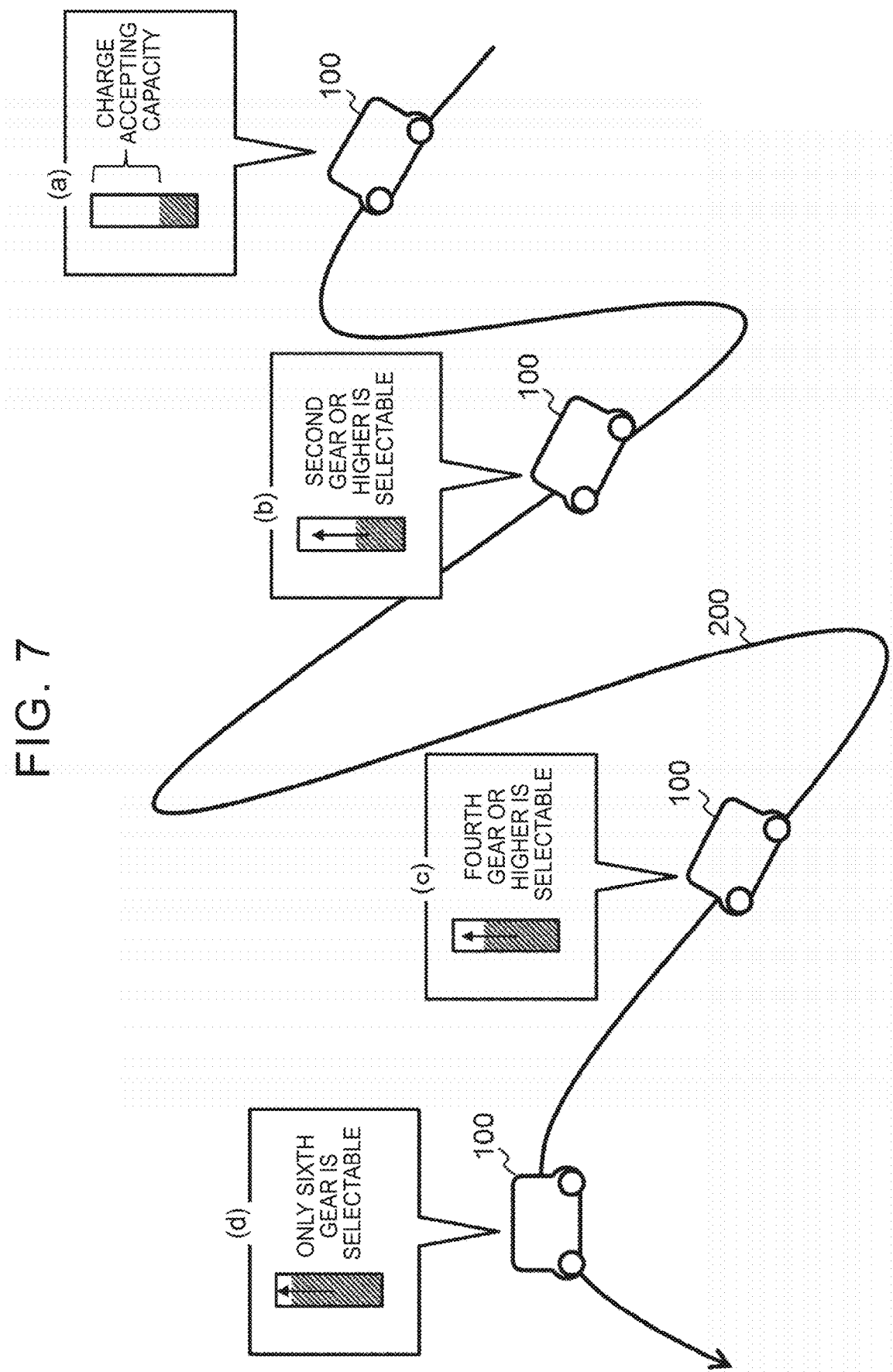

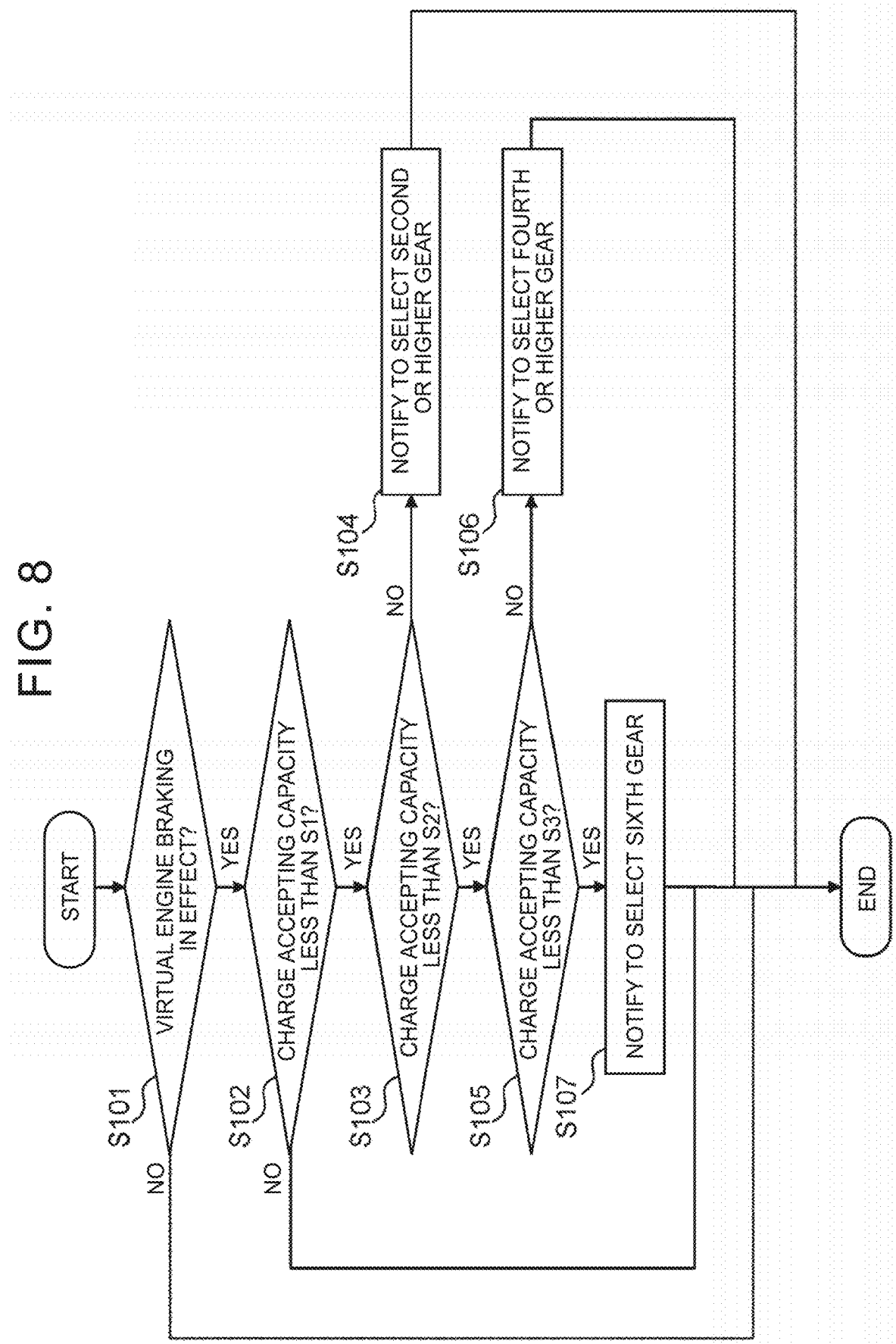

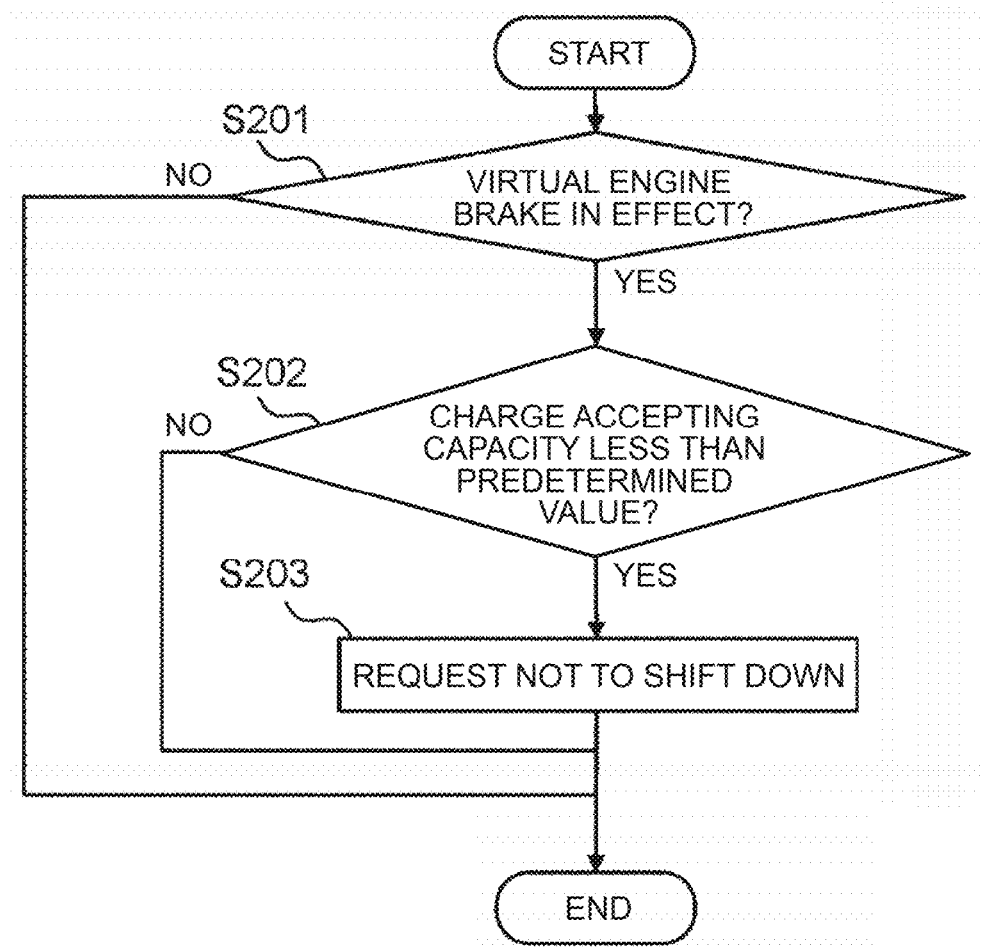

BATTERY ELECTRIC VEHICLE

CROSS-REFERENCE TO RELATED APPLICATION

This application claims priority to Japanese Patent Application No. 2023-190674 filed on Nov. 8, 2023, incorporated herein by reference in its entirety.

BACKGROUND

1. Technical Field

The present disclosure relates to battery electric vehicles including an electric motor as a driving source.

2. Description of Related Art

Japanese Patent No. 6787507 (JP 6787507 B) discloses a battery electric vehicle that can simulate manual shifting operations of a vehicle with a manual transmission powered by an internal combustion engine (hereinafter referred to as "manual transmission internal combustion engine vehicle") by controlling an electric motor.

Engine braking is a braking method unique to manual transmission internal combustion engine vehicles. The above technique allows a driver to experience as if he or she were operating a manual transmission internal combustion engine vehicle while driving a battery electric vehicle. While research is underway to replicate clutch operations and shift operations, there has been little progress in replicating engine braking without compromising an operation feel as if a driver is operating an actual manual transmission internal combustion engine vehicle.

SUMMARY

According to one aspect of the present disclosure, a battery electric vehicle includes an electric motor as a driving source. The battery electric vehicle includes: a driving operation member that is used to drive the battery electric vehicle; a pseudo shifting operation member imitating an operation member that is used to perform a shifting operation of a manual transmission internal combustion engine vehicle; a processor that controls the battery electric vehicle according to operation of the driving operation member; and an in-vehicle battery that is charged with electrical energy generated when regenerative braking is applied. The processor is configured to execute, according to selection by a driver, a control mode in which operation of the pseudo shifting operation member is associated with torque of the electric motor. In the control mode, the processor is configured to: determine virtual shift positions based on the operation of the pseudo shifting operation member; when the battery electric vehicle is traveling and there is no accelerator operation input, apply the regenerative braking with a strength according to the virtual shift positions; and notify the driver of a shift position according to a charge accepting capacity of the in-vehicle battery.

In the battery electric vehicle of the present disclosure, engine braking of a manual transmission internal combustion engine vehicle is replicated by regenerative braking. The use of regenerative braking may be restricted depending on the charge accepting capacity of the in-vehicle battery. In such a case, the driver is notified of the shift position according to the charge accepting capacity. Adjusting the shift position by the driver allows engine braking to be replicated even when the amount of regenerative power that can be stored is small. This also allows the driver to continue driving the battery electric vehicle without compromising a realistic operation feel of a manual transmission internal combustion engine vehicle. This can increase the driver satisfaction.

BRIEF DESCRIPTION OF THE DRAWINGS

Features, advantages, and technical and industrial significance of exemplary embodiments of the present disclosure will be described below with reference to the accompanying drawings, in which like signs denote like elements, and wherein:

FIG. 6 shows the configuration of the controller related to virtual engine braking;

FIG. 7 is a conceptual diagram illustrating notification to a driver regarding shift positions;

FIG. 8 is a flowchart showing a first example of a process of the controller related to notification to a driver; and FIG. 9 is a flowchart showing a second example of the process of the controller related to notification to a driver.

DETAILED DESCRIPTION OF EMBODIMENTS

An embodiment of the present disclosure will be described with reference to the accompanying drawings.

1. Configuration of Power System of Battery Electric Vehicle

Figure 1:
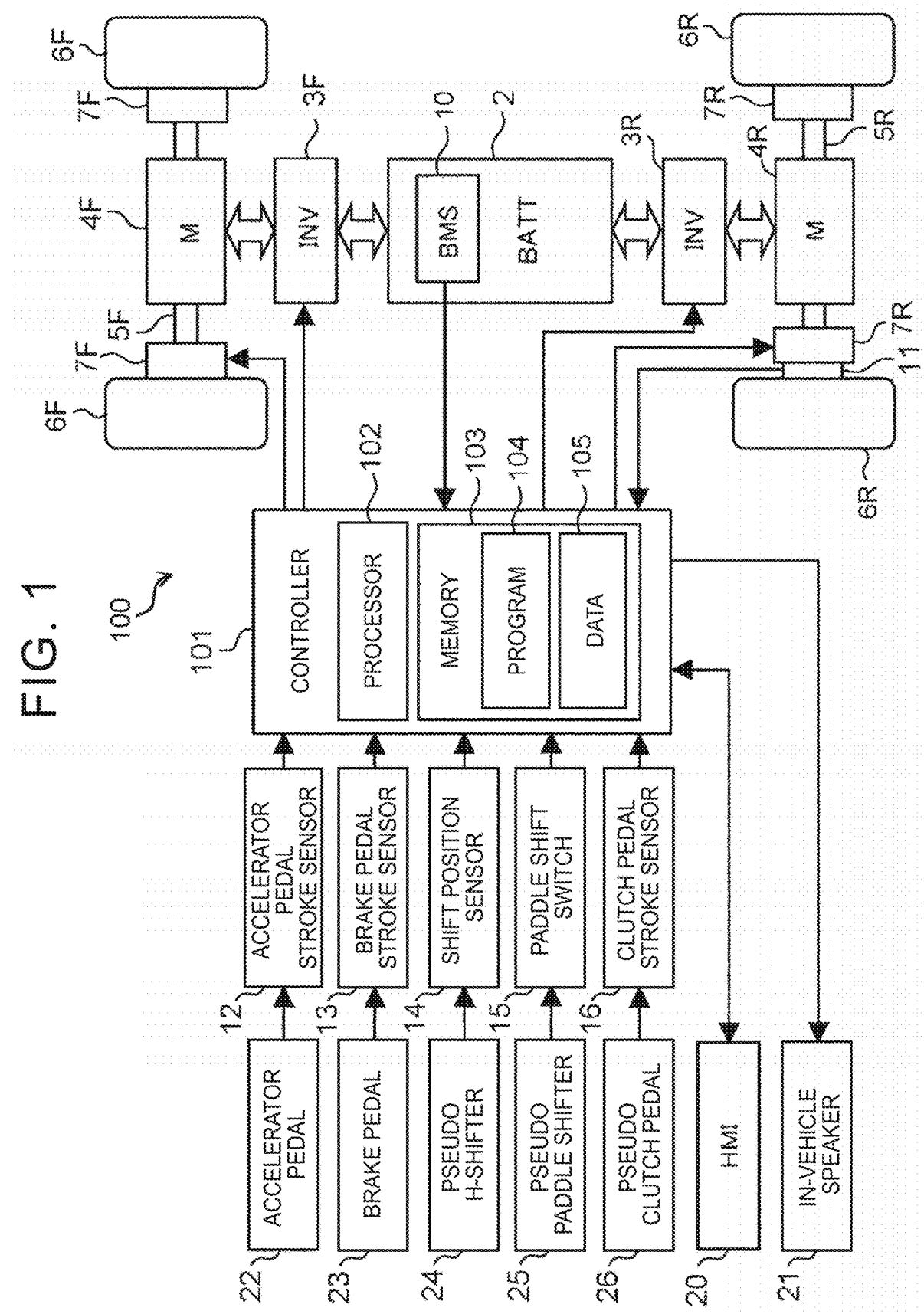
FIG. 1 shows the configuration of a battery electric vehicle according to an embodiment of the present disclosure.

FIG. 1 schematically shows the configuration of a battery electric vehicle 100 according to an embodiment of the present disclosure. First, the configuration of a power system of the battery electric vehicle 100 will be described with reference to FIG. 1.

The battery electric vehicle 100 includes two electric motors (M) 4F, 4R at the front and rear. The electric motors 4F, 4R have a function to convert supplied electric power to torque and a function to convert input torque to electric power. The electric motors 4F, 4R are, for example, three-phase alternating current (AC) motors. The front electric motor 4F is connected to front drive shafts 5F that drive front wheels 6F. The rear electric motor 4R is connected to rear drive shafts 5R that drive rear wheels 6R. The front wheels 6F are suspended on electronically controlled right and left front suspensions 7F that are independent of each other. The rear wheels 6R are suspended on electronically controlled right and left rear suspensions 7R that are independent of each other.

The electric motors 4F, 4R are used as a traction power source. The front electric motor 4F and the rear electric motor 4R are equipped with inverters (INV) 3F, 3R, respectively. The front inverter 3F and the rear inverter 3R are each connected to a battery (BATT) 2. The battery 2 stores electrical energy for driving the electric motors 4F, 4R. That is, the battery electric vehicle 100 is a battery electric vehicle (BEV) that runs on the electrical energy stored in the battery 2. The inverters 3F, 3R are, for example, voltage inverters, and control torque of the electric motors 4F, 4R, respectively, by pulse width modulation (PWM) control.

The front electric motor 4F and the rear electric motor 4R function as generators that generate regenerative electric power from the torque input from the front drive shafts 5F and the rear drive shafts 5R, respectively. Operating the electric motors 4F, 4R as generators during traveling of the battery electric vehicle 100 can decelerate the battery electric vehicle 100 by regenerative braking. At this time, the battery 2 is charged via the inverters 3F, 3R with the regenerative electric power generated by the electric motors 4F, 4R.

In the above description, the drive electric motors 4F, 4R are described as functioning also as generators. However, the battery electric vehicle 100 may include, at the front and rear, drive electric motors and generators disposed separately from the drive electric motors.

2. Configuration of Control System of Battery Electric Vehicle

Next, the configuration of a control system of the battery electric vehicle 100 will be described with reference to FIG. 1.

The battery electric vehicle 100 includes a battery management system (BMS) 10. The battery management system 10 is a device that monitors the cell voltage, current, temperature, etc. of the battery 2. The battery management system 10 has a function to estimate a state of charge (SOC) of the battery 2. Other functions of the battery management system 10 include a function to estimate the charge accepting capacity of the battery 2, that is, the capacity obtained by subtracting the current available capacity of the battery 2 from the full charge capacity of the battery 2.

The battery electric vehicle 100 includes a vehicle speed sensor 11. At least one of wheel speed sensors, not shown, mounted on the right and left front wheels 6F and the right and left rear wheels 6R is used as the vehicle speed sensor 11. The battery electric vehicle 100 also includes an accelerator pedal stroke sensor 12. The accelerator pedal stroke sensor 12 is provided for an accelerator pedal 22, and outputs a signal indicating the amount of depression of the accelerator pedal 22, i.e., the accelerator operation amount. The battery electric vehicle 100 further includes a brake pedal stroke sensor 13. The brake pedal stroke sensor 13 is provided for a brake pedal 23, and outputs a signal indicating the amount of depression of the brake pedal 23, that is, the brake operation amount.

The accelerator pedal 22 and the brake pedal 23 are driving operation members that are used to drive the battery electric vehicle 100. In addition to these driving operation members, the battery electric vehicle 100 includes pseudo shifting operation members imitating operation members that are used to perform shifting operations of a manual transmission internal combustion engine vehicle. The pseudo shifting operation members include a pseudo H-shifter 24, a pseudo paddle shifter 25, and a pseudo clutch pedal 26, which will be described below.

The pseudo H-shifter 24 is a dummy different from a real H-shifter. The pseudo H-shifter 24 has a structure imitating a shift stick provided on a console, and is movable between shift positions along an H-pattern gate. Since the battery electric vehicle 100 does not have an actual transmission, the shift positions of the pseudo H-shifter 24 are virtual shift positions. The pseudo H-shifter 24 is provided with a shift position sensor 14. The shift position sensor 14 outputs a signal indicating the shift position selected by the pseudo H-shifter 24.

The pseudo paddle shifter 25 is a dummy different from a real paddle shifter that is a type of sequential shifter. The pseudo paddle shifter 25 has a structure imitating shift paddles attached to a steering wheel, and includes right and left paddles that can be moved independently. The pseudo paddle shifter 25 is provided with a paddle shift switch 15. The paddle shift switch 15 outputs an upshift signal when the right paddle is pulled, and outputs a downshift signal when the left paddle is pulled.

The pseudo clutch pedal 26 is a dummy different from a real clutch pedal. The pseudo clutch pedal 26 has a structure imitating a clutch pedal of a conventional manual transmission internal combustion engine vehicle. For example, the pseudo clutch pedal 26 includes a reaction force mechanism that generates a reaction force in response to depression of the pseudo clutch pedal 26 by a driver. A start position of the pseudo clutch pedal 26 is a position when no depressing force is applied to the pseudo clutch pedal 26. An end position of the pseudo clutch pedal 26 is a position when the pseudo clutch pedal 26 is depressed all the way down. The driver can operate the pseudo clutch pedal 26 from the start position to the end position against the reaction force from the reaction force mechanism. The pseudo clutch pedal 26 is provided with a clutch pedal stroke sensor 16. The clutch pedal stroke sensor 16 outputs a signal indicating the amount of depression of the pseudo clutch pedal 26. Since the battery electric vehicle 100 does not have an actual clutch, the amount of operation of the pseudo clutch pedal 26, that is, the clutch operation amount, is a virtual clutch operation amount.

The pseudo clutch pedal 26 is a pedal-type operation device that is operated by foot. A lever-type or dial-type operation device that is operated by hand may be provided as a pseudo clutch operation device. The pseudo clutch operation device may have various structures as long as the driver can operate the pseudo clutch operation device from its start position to its end position against the reaction force and can experience an operation feel like a clutch pedal of a conventional manual transmission internal combustion engine vehicle with his or her foot or hand.

The battery electric vehicle 100 further includes a human-machine interface (HMI) 20 as an interface with the driver, and an in-vehicle speaker 21. The HMI 20 includes a touch panel display. The HMI 20 displays information on the touch panel display, and receives inputs from the driver through touch operations on the touch panel display. The in-vehicle speaker 21 can provide information to the driver by voice, and can also output a pseudo engine sound described later.

The battery electric vehicle 100 includes a controller 101. Sensors and devices to be controlled that are mounted on the battery electric vehicle 100 are connected to the controller 101 via an in-vehicle network. In addition to the battery management system 10, the vehicle speed sensor 11, the accelerator pedal stroke sensor 12, the brake pedal stroke sensor 13, the shift position sensor 14, the paddle shift switch 15, and the clutch pedal stroke sensor 16, various other sensors are mounted on the battery electric vehicle 100.

The controller 101 is typically an electronic control unit (ECU). The controller 101 may be a combination of a plurality of ECUs. The controller 101 includes at least a processor 102 and a memory 103. The memory 103 includes a random access memory (RAM) for temporarily recording data and a read-only memory (ROM) for storing a program 104 that is executable by the processor 102 and various types of data 105 related to the program. The program 104 is composed of a plurality of instructions. The processor 102 reads the program 104 and the data 105 from the memory 103, executes the program 104, and generates control signals based on signals acquired from the sensors. The controller 101 may include one processor 102, or may include a plurality of processors 102.

The controller 101 can control the battery electric vehicle 100 in various control modes. The driver can select a control mode himself or herself by performing a touch operation on the touch panel display of the HMI 20. Specifically, when a touch operation is performed on the touch panel display of the HMI 20, one or more programs 104 linked with that touch operation are read from the memory 103 and executed by the processor 102. The control modes of the battery electric vehicle 100 by the controller 101 that can be selected by the driver by operating the HMI 20 will be described below.

3. Control Modes of Battery Electric Vehicle

Figure 2:
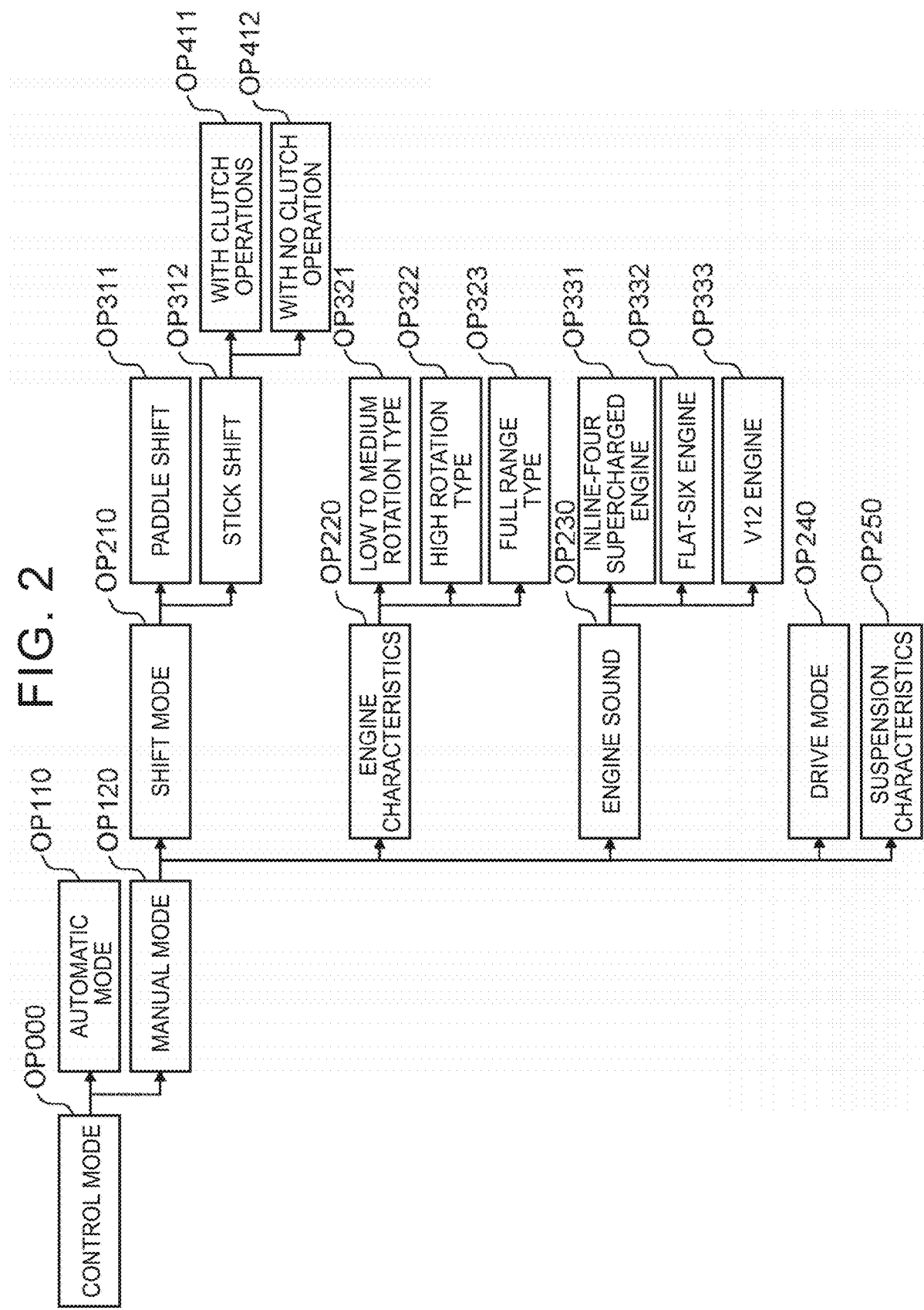
FIG. 2 is a tree diagram showing an example of control modes of the battery electric vehicle that can be selected by a controller.
Figure 3:
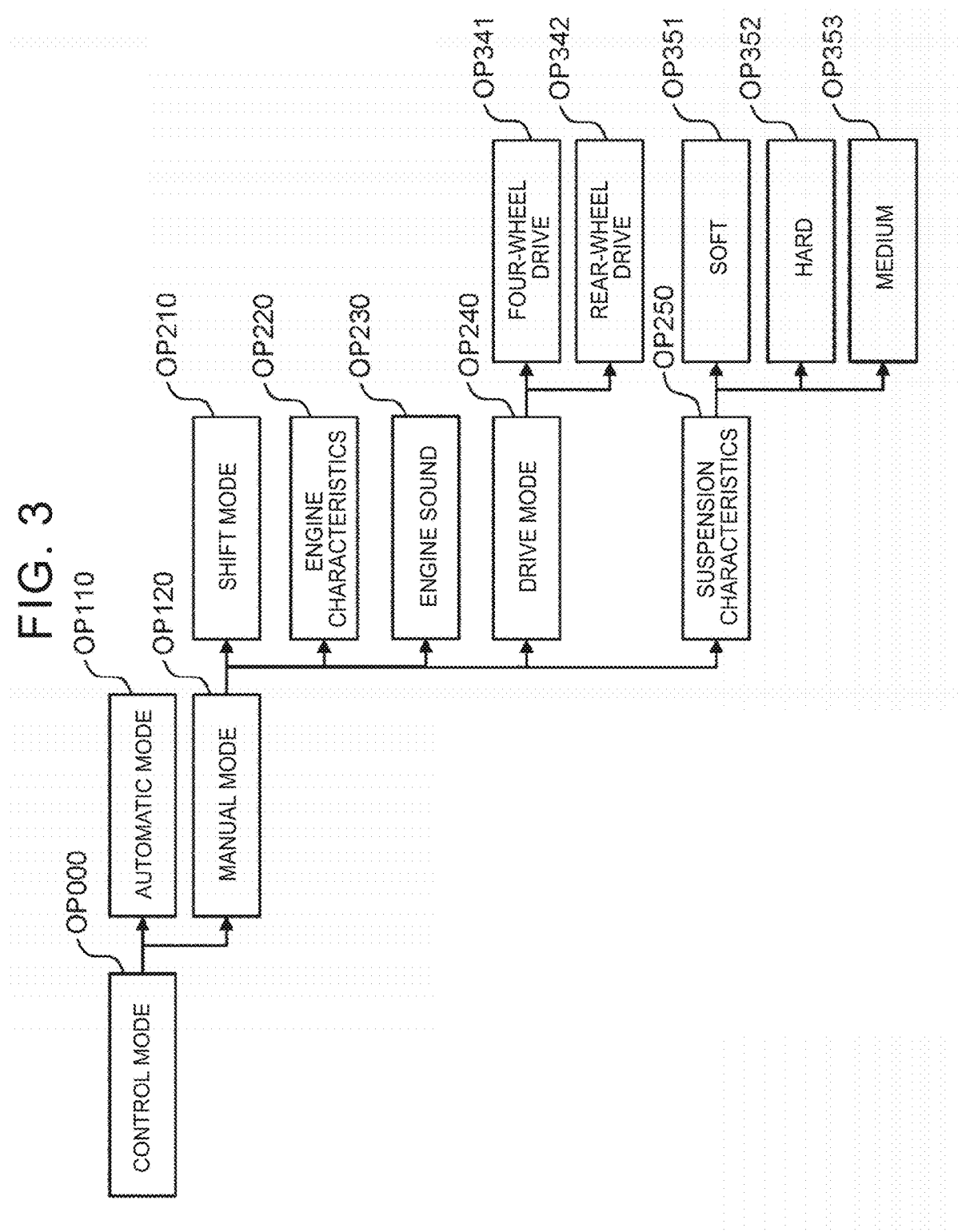
FIG. 3 is a tree diagram showing an example of the control modes of the battery electric vehicle that can be selected by the controller.

FIGS. 2 and 3 are tree diagrams showing an example of the control modes of the battery electric vehicle 100 that can be selected by the controller 101. A selection screen is displayed on the touch panel display of the HMI 20 according to the control tree shown in FIG. 2.

An option "control mode" OP000 is displayed on the initial screen of the HMI 20. When the option "control mode" OP000 is selected, options "automatic mode" OP110 and "manual mode" OP120 are displayed on the touch panel display. When the option "automatic mode" OP110 is selected, the control mode of the battery electric vehicle 100 is switched to an automatic mode. The automatic mode is a control mode in which the battery electric vehicle 100 is driven as a normal BEV. In the automatic mode, the driver can basically drive the battery electric vehicle 100 only by operating the accelerator pedal 22, the brake pedal 23, and the steering wheel, not shown. In the automatic mode, shift operations of the pseudo H-shifter 24, shift operations of the pseudo paddle shifter 25, and clutch operations of the pseudo clutch pedal 26 are disabled.

When the option "manual mode" OP120 is selected, the control mode of the battery electric vehicle 100 is switched to a manual mode. The manual mode is a control mode in which the battery electric vehicle 100 is operated like a manual transmission internal combustion engine vehicle. When the option "manual mode" OP120 is selected, options "shift mode" OP210, "engine characteristics" OP220, "engine sound" OP230, "drive mode" OP240, and "suspension characteristics" OP250 are displayed on the touch panel display. By combining the options OP210 to OP250 as desired, the driver can determine the characteristics of a manual transmission internal combustion engine vehicle that he or she wants the battery electric vehicle 100 to simulate.

The option "shift mode" OP210 is an option to select a shift mode of a manual transmission when the battery electric vehicle 100 is to be operated like a manual transmission internal combustion engine vehicle. As shown in FIG. 2, when the option "shift mode" OP210 is selected, options "paddle shift" OP311 and "stick shift" OP312 are displayed on the touch panel display. When the option "paddle shift" OP311 is selected, the shift mode of the manual transmission to be replicated by the battery electric vehicle 100 is switched to a paddle shift mode. The paddle shift mode is a mode in which the pseudo paddle shifter 25 is used for shift operations. In the paddle shift mode, shift operations of the pseudo H-shifter 24 are disabled. In the paddle shift mode, the operation when the gear ratio of the manual transmission is changed is replicated by a shift operation of the pseudo paddle shifter 25. Clutch operations in a real paddle-shift manual transmission are automatically performed by a robot. Therefore, no clutch operations of the pseudo clutch pedal 26 are required in the paddle shift mode. In the paddle shift mode, clutch operations of the pseudo clutch pedal 26 are disabled.

When the option "stick shift" OP312 is selected, a stick shift mode is selected. The stick shift mode is a mode in which the pseudo H-shifter 24 is used for shift operations. In the stick shift mode, shift operations of the pseudo paddle shifter 25 are disabled. In the stick shift mode, the operation when the gear ratio of the manual transmission is changed is replicated by a shift operation of the pseudo H-shifter 24. Some real H-shifter manual transmissions allow the driver to perform clutch operations while others leave clutch operations to a robot. When the option "stick shift" OP312 is selected, options "with clutch operations" OP411 and "with no clutch operation" OP412 are displayed on the touch panel display. When the option "with clutch operations" OP411 is selected, the stick shift mode is switched to a mode that requires clutch operations of the pseudo clutch pedal 26. On the other hand, when the option "with no clutch operation" OP412 is selected, clutch operations of the pseudo clutch pedal 26 are disabled, and the stick shift mode is switched to a mode that does not require clutch operations of the pseudo clutch pedal 26.

The option "engine characteristics" OP220 is an option to select characteristics of an internal combustion engine when the battery electric vehicle 100 is to be operated like a manual transmission internal combustion engine vehicle. As shown in FIG. 2, when the option "engine characteristics" OP220 is selected, options "low to medium rotation type" OP321, "high rotation type" OP322, and "full range type" OP323 are displayed on the touch panel display. When the option "low to medium rotation type" OP321 is selected, the characteristics of the internal combustion engine to be replicated by the battery electric vehicle 100 are switched to a low to medium rotation type in which the torque in a low to medium rotation range is relatively high. When the option "high rotation type" OP322 is selected, the characteristics of the internal combustion engine to be replicated by the battery electric vehicle 100 are switched to a high rotation type in which the torque in a high rotation range is relatively high. When the option "full range type" OP323 is selected, the characteristics of the internal combustion engine to be replicated by the battery electric vehicle 100 are switched to a full range type in which the torque is uniform in the entire rotation range. Note that the low to medium rotation type, the high rotation type, and the full range type are merely examples of the engine characteristics that can be replicated by control of the battery electric vehicle 100.

The option "engine sound" OP230 is an option to select an engine sound to be replicated by the battery electric vehicle 100. As shown in FIG. 2, when the option "engine sound" OP230 is selected, options "inline-four supercharged engine" OP331, "flat-six engine" OP332, and "V12 engine" OP333 are displayed on the touch panel display. When the option "inline-four supercharged engine" OP331 is selected, the engine sound to be replicated by the battery electric vehicle 100 is switched to an engine sound of an inline-four supercharged engine. When the option "flat-six engine" OP332 is selected, the engine sound to be replicated by the battery electric vehicle 100 is switched to an engine sound of a flat-six engine. When the option "V12 engine" OP333 is selected, the engine sound to be replicated by the battery electric vehicle 100 is switched to an engine sound of a V12 engine. Note that the inline-four supercharged engine, the flat-six engine, and the V12 engine are merely examples of the engine sound that can be replicated by the battery electric vehicle 100.

The option "drive mode" OP240 is an option to select a drive mode of the battery electric vehicle 100. As shown in FIG. 3, when the option "drive mode" OP240 is selected, options "four-wheel drive" OP341 and "rear-wheel drive" OP342 are displayed on the touch panel display. When the option "four-wheel drive" OP341 is selected, the drive mode of the battery electric vehicle 100 is switched to a four-wheel drive mode. In the four-wheel drive mode, the front wheels 6F are driven by the front electric motor 4F, and the rear wheels 6R are driven by the rear electric motor 4R. Torque distribution between the front wheels 6F and the rear wheels 6R can be fixed or made variable by controlling the electric motors 4F, 4F by the inverters 3F, 3R. When the option "rear-wheel drive" OP342 is selected, the drive mode of the battery electric vehicle 100 is switched to a rear-wheel drive mode. In the rear-wheel drive mode, only the rear wheels 6R are driven by the rear electric motor 4R. The drive mode of the battery electric vehicle 100 may include an option of a front-wheel drive mode in which only the front wheels 6F are driven by the front electric motor 4F, instead of or in addition to the rear-wheel drive mode.

The option "suspension characteristics" OP250 is an option to select suspension characteristics of the battery electric vehicle 100. As shown in FIG. 3, when the option "suspension characteristics" OP250 is selected, options "soft" OP351, "hard" OP352, and "medium" OP353 are displayed on the touch panel display. When the option "soft" OP351 is selected, the suspension characteristics of the battery electric vehicle 100 are switched to a soft mode. In the soft mode, damping forces of the suspensions 7F, 7R are reduced. When the option "hard" OP352 is selected, the suspension characteristics of the battery electric vehicle 100 are switched to a hard mode. In the hard mode, the damping forces of the suspensions 7F, 7R are increased. When the option "medium" OP353 is selected, the suspension characteristics of the battery electric vehicle 100 are switched to a medium mode. In the medium mode, the damping forces of the suspensions 7F, 7R are set to an intermediate value between the value in the soft mode and the value in the hard mode. Since the suspensions 7F, 7R are electronically controlled suspensions, the suspension characteristics of the suspensions 7F, 7R can be adjusted in a wide range. Therefore, the soft mode, the hard mode, and the medium mode are merely examples of the suspension characteristics that can be implemented in the battery electric vehicle 100. The drive mode and the suspension characteristics may be selectable not only in the manual mode but also in the automatic mode.

The driver can switch the control mode of the battery electric vehicle 100 to his or her preference by operating the touch panel display of the HMI 20 according to the control tree described above. The switchable control modes include modes related to driving control of the battery electric vehicle 100 and modes related to sound control of the battery electric vehicle 100. Specifically, the modes related to the option "engine sound" OP230 are the modes related to sound control. The remaining modes are the modes related to driving control. In the following sections, the driving control and sound control of the battery electric vehicle 100 by the controller 101 will be described.

4. Driving Control of Battery Electric Vehicle

Figure 4:
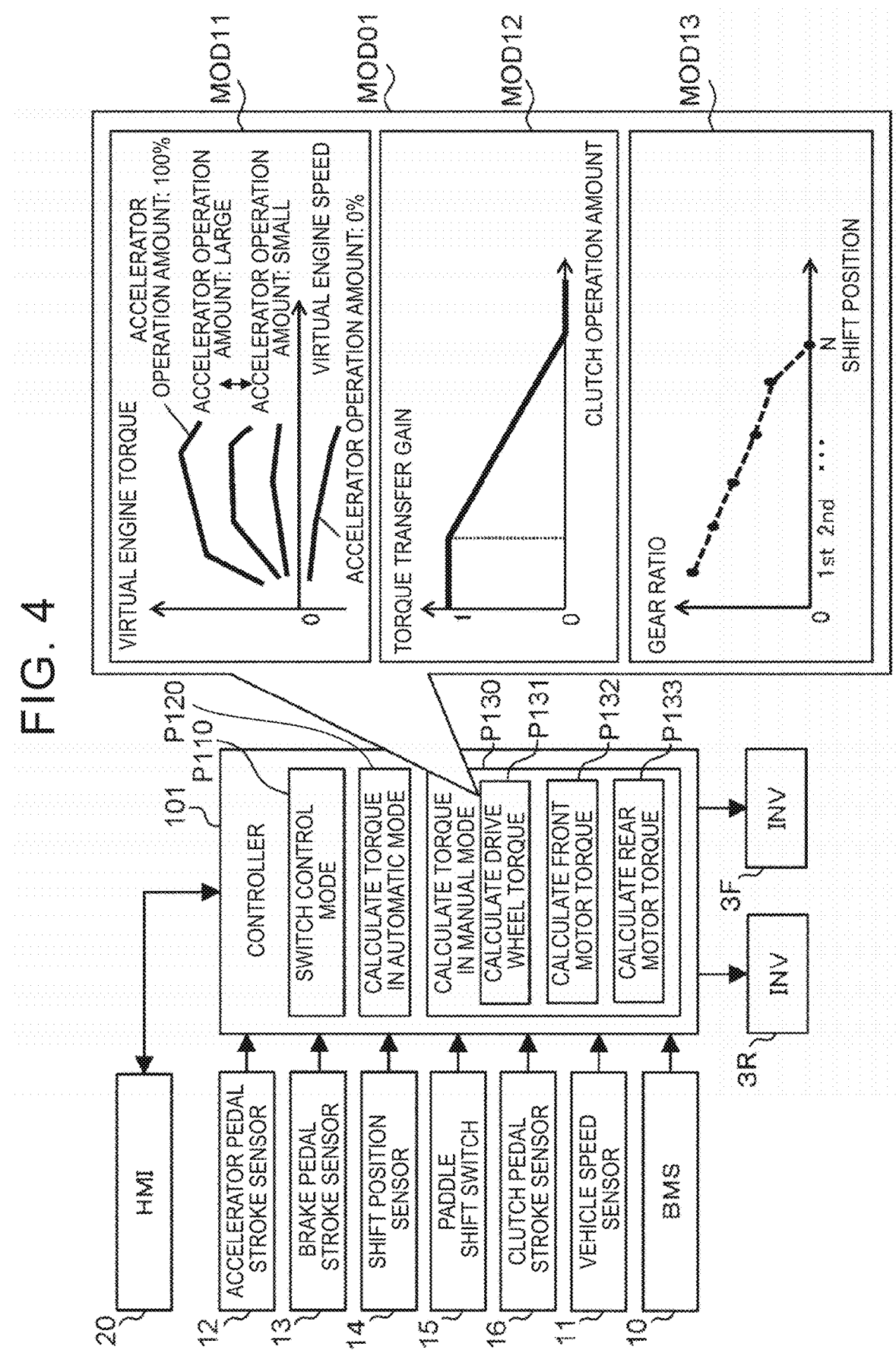
FIG. 4 shows the configuration of the controller related to driving control of the battery electric vehicle.

FIG. 4 shows the configuration of the controller 101 related to the driving control of the battery electric vehicle 100. Specifically, FIG. 4 shows a configuration related particularly to torque control out of the driving control. The processor 102 functions as a driving control device when the processor 102 executes one or more driving control programs 104 stored in the memory 103.

A control mode signal is input from the HMI 20 to the controller 101 that functions as a driving control device. The control mode signal includes information about the control mode selected by the driver. The controller 101 performs a process P110 based on the control mode signal. In the process P110, the control mode is switched according to the control mode signal. Switching of the control mode that particularly affects the driving control is switching between the automatic mode and the manual mode.

When the control mode is switched to the automatic mode, the controller 101 performs a process P120 of calculating torque in the automatic mode. In the process P120, the controller 101 acquires a vehicle speed from a signal from the vehicle speed sensor 11, and acquires an accelerator operation amount from a signal from the accelerator pedal stroke sensor 12. The controller 101 has a motor torque map that uses an accelerator operation amount and a vehicle speed as parameters. The controller 101 inputs the acquired vehicle speed and accelerator operation amount to the motor torque map, and controls the inverters 3F, 3R so as to cause the electric motors 4F, 4R to generate the torque obtained from the motor torque map.

When the control mode is switched to the manual mode, the controller 101 performs a process P130 of calculating torque in the manual mode. The process P130 includes a process P131 of calculating torque to be generated by drive wheels. The process P130 also includes a process P132 and a process P133. The process P132 is a process of calculating torque to be generated by the front electric motor 4F. The process P133 is a process of calculating torque to be generated by the rear electric motor 4R. The processes P132, P133 are performed according to the drive wheel torque calculated in the process P130 and the torque distribution between the front wheels 6F and the rear wheels 6R.

A vehicle model MOD01 is used to calculate the drive wheel torque in the process P131. The vehicle model MOD01 includes an engine model MOD11, a clutch model MOD12, and a transmission model MOD13. An engine virtually implemented by the vehicle model MOD01 will be referred to as "virtual engine." A clutch virtually implemented by the vehicle model MOD01 will be referred to as "virtual clutch." A transmission virtually implemented by the vehicle model MOD01 will be referred to as "virtual transmission." The engine model MOD11 models the virtual engine. The clutch model MOD12 models the virtual clutch. The transmission model MOD13 models the virtual transmission.

The engine model MOD11 calculates a virtual engine speed and virtual engine torque. The virtual engine speed is calculated from the vehicle speed, the overall reduction ratio, and the slip ratio of the virtual clutch. The virtual engine torque is calculated from the virtual engine speed and the accelerator operation amount. The vehicle speed is acquired from a signal from the vehicle speed sensor 11. The accelerator operation amount is acquired from a signal from the accelerator pedal stroke sensor 12. The overall reduction ratio is a numerical value obtained by multiplying the gear ratio of the virtual transmission by the reduction ratio determined by the mechanical structure from the virtual transmission to the drive wheels. The engine model MOD11 defines the relationship between the virtual engine speed and the virtual engine torque for each accelerator operation amount. The driver can select engine characteristics of the engine model MOD11 by operating the HMI 20. In the example shown in FIG. 2, the engine characteristics can be selected from the low to medium rotation type, the high rotation type, and the full range type.

The clutch model MOD12 calculates a torque transfer gain. The torque transfer gain is a gain for calculating the degree of torque transfer of the virtual clutch according to the clutch operation amount. When the stick shift mode with clutch operations is selected as the shift mode, the clutch operation amount is acquired from a signal from the clutch pedal stroke sensor 16. The clutch operation amount is 0% at the start position of the pseudo clutch pedal 26 and is 100% at the end position of the pseudo clutch pedal 26. The clutch model MOD12 gives the torque transfer gain with respect to the clutch operation amount. The torque transfer gain is converted to the clutch torque capacity of the virtual clutch, i.e., the virtual clutch torque capacity. Virtual clutch torque that is input from the virtual clutch to the virtual transmission is calculated based on a comparison between the virtual clutch torque capacity and the virtual engine torque calculated by the engine model MOD11. The clutch model MOD12 calculates the slip ratio by subtracting the torque transfer gain from 1. The slip ratio is used to calculate the virtual engine speed in the engine model MOD11.

When the paddle shift mode is selected as the shift mode, the clutch operation amount to be input to the clutch model MOD12 is calculated using a clutch operation model. Also, when the stick shift mode with no clutch operation is selected as the shift mode, the clutch operation amount to be input to the clutch model MOD12 is calculated using the clutch operation model. The clutch operation model is a model that simulates clutch operations by a model driver. When the paddle shift mode is selected, the vehicle speed, the virtual engine speed, and a signal from the paddle shift switch 15 are input to the clutch operation model. When the stick shift mode with no clutch operation is selected, the vehicle speed, the virtual engine speed, and a signal from the shift position sensor 14 are input to the clutch operation model.

The signal from the paddle shift switch 15 and the signal from the shift position sensor 14 are used to determine the timing of a clutch operation. When a shift operation by the driver is detected based on the signal from the paddle shift switch 15 or the signal from the shift position sensor 14, the clutch operation model maximizes the clutch opening amount to disengage the virtual clutch. The vehicle speed and the virtual engine speed are used to calculate the clutch operation amount. The clutch operation model calculates the clutch operation amount based on the difference between the rotational speed of an input shaft of the virtual transmission calculated from the vehicle speed and the virtual engine speed, so as to smoothly match the rotational speed of the input shaft of the virtual transmission with the virtual engine speed.

The transmission model MOD13 calculates a virtual gear ratio. The virtual gear ratio is a gear ratio determined by the virtual shift position of the virtual transmission. The virtual gear ratio is set for each shift position. The highest virtual gear ratio is set for first gear, followed by second gear, third gear, fourth gear, . . . in descending order. In the stick shift mode, the shift positions are in one-to-one correspondence with the signals from the shift position sensor 14. In the paddle shift mode, the shift position is shifted up by one gear in response to an upshift signal from the paddle shift switch 15, and the shift position is shifted down by one gear in response to a downshift signal from the paddle shift switch 15. While the number of shift positions of the pseudo H-shifter 24 is physically determined, there is no physical limit on the number of shift positions of the pseudo paddle shifter 25. Therefore, the transmission model MOD13 may be set differently between the stick shift mode and the paddle shift mode so that the number of shift positions in the paddle shift mode is larger than the number of shift positions in the stick shift mode.

The transmission model MOD13 calculates virtual transmission torque using the virtual gear ratio and the virtual clutch torque. The virtual transmission torque is virtual torque output from the virtual transmission. The controller 101 controls the inverters 3F, 3R so as to change the output torques of the electric motors 4F, 4R according to the virtual transmission torque. The virtual transmission torque changes discontinuously in response to a change in virtual gear ratio. Such a discontinuous change in virtual transmission torque causes torque shock in the battery electric vehicle 100, creating a feel of a vehicle with a stepped transmission.

The vehicle model MOD01 calculates the drive wheel torque from the virtual transmission torque and the reduction ratio. When the four-wheel drive mode is selected as the drive mode, the drive wheel torque is the sum of torques applied to the right and left front wheels 6F and the right and left rear wheels 6R. The torque distribution between the front wheels 6F and the rear wheels 6R may be fixed, or may be actively or passively varied. When the rear-wheel drive mode is selected as the drive mode, the drive wheel torque is the sum of torques applied to the right and left rear wheels 6R.

In the process P132, the torque of the front electric motor 4F (front motor torque) in the manual mode is calculated by multiplying the drive wheel torque calculated in the process P131 by the torque distribution rate to the front wheels 6F and the reduction ratio from an output shaft of the front electric motor 4F to the front wheels 6F. The controller 101 controls the front inverter 3F so as to cause the front electric motor 4F to generate the front motor torque calculated in the process P132.

In the process P133, the torque of the rear electric motor 4R (rear motor torque) in the manual mode is calculated by multiplying the drive wheel torque calculated in the process P131 by the torque distribution rate to the rear wheels 6R and the reduction ratio from an output shaft of the rear electric motor 4R to the rear wheels 6R. The controller 101 controls the rear inverter 3R so as to cause the rear electric motor 4R to generate the rear motor torque calculated in the process P133.

In the configuration shown in FIG. 4, the battery management system 10 and the brake pedal stroke sensor 13 are not necessarily required for the driving control described above. However, when switching of the control mode affects the SOC of the battery 2, a signal from the battery management system 10 may be used as information for determining whether to allow switching of the control mode. In the case where the method of operating the battery electric vehicle 100 changes significantly such as when the control mode is switched between the automatic mode and the manual mode, the condition for switching the control mode may be that the brake pedal 23 is being depressed. In that case, a signal from the brake pedal stroke sensor 13 can be used as information for determining whether the brake pedal 23 is being depressed.

5. Sound Control of Battery Electric Vehicle

Figure 5:
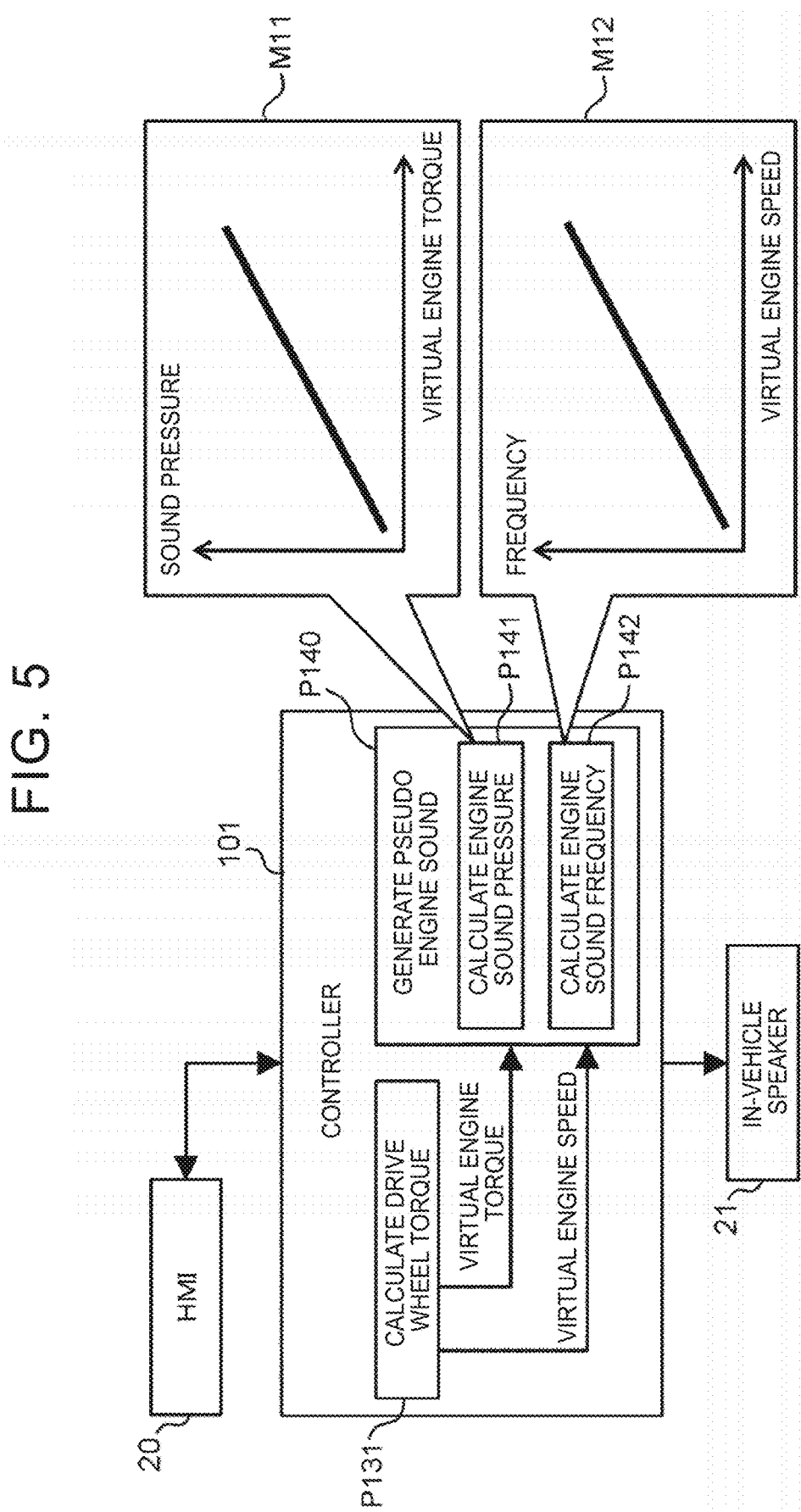
FIG. 5 shows the configuration of the controller related to sound control of the battery electric vehicle.

FIG. 5 shows the configuration of the controller 101 related to the sound control of the battery electric vehicle 100. The processor 102 functions as a sound control device when the processor 102 executes one or more sound control programs 104 stored in the memory 103. The processor 102 functioning as a driving control device and the processor 102 functioning as a sound control device may be different processors, or may be the same processor.

The controller 101 functioning as a sound control device can output artificially generated sounds from the in-vehicle speaker 21. One of such artificial sounds is a pseudo engine sound that imitates an engine sound of a conventional internal combustion engine vehicle. When a control mode signal indicating that the manual mode has been selected is received from the HMI 20, the controller 101 functioning as a sound control device performs a process P140. In the process P140, a pseudo engine sound is generated based on the virtual engine torque and virtual engine speed calculated in the process P131.

In the process P140, an engine sound selected via the HMI 20 is used as a sound source of the pseudo engine sound to be generated from the in-vehicle speaker 21. In the example shown in FIG. 2, an engine sound selected from the inline-four supercharged engine, the flat-six engine, and the V12 engine is used as a sound source of the pseudo engine sound. However, in the process P140, the sound from the sound source is not used as it is. In the process P140, the sound pressure of the sound source is changed by, for example, an amplifier, and the frequency of the sound source is changed by, for example, a frequency modulator.

The process P140 includes a process P141 of calculating an engine sound pressure and a process P142 of calculating an engine sound frequency. In the process P141, the sound pressure of the pseudo engine sound is calculated from the virtual engine torque using a sound pressure map M11. The sound pressure map M11 is created so that the sound pressure increases as the virtual engine torque increases. In the process P142, the frequency of the pseudo engine sound is calculated from the virtual engine speed using a frequency map M12. The frequency map M12 is created so that the frequency increases as the virtual engine speed increases. The virtual engine torque and the virtual engine speed change according to the driver's accelerator operation, shift operation, and clutch operation. Changing the sound pressure and frequency of the pseudo engine sound according to the virtual engine torque and virtual engine speed that change as described above can give the driver a feel as if he or she were actually driving a real manual transmission internal combustion engine vehicle.

6. Replication of Engine Braking by Regenerative Braking 6-1. Overview

By switching the control mode to the manual mode via the HMI 20, the driver of the battery electric vehicle 100 can experience as if he or she were operating a manual transmission internal combustion engine vehicle while driving the battery electric vehicle 100. While the control mode is set to the manual mode, the battery electric vehicle 100 is controlled to replicate behaviors of a manual transmission internal combustion engine vehicle.

One of the behaviors that are unique to manual transmission internal combustion engine vehicles is engine braking. When the battery electric vehicle 100 is in the manual mode, application of engine braking is also replicated. However, since the battery electric vehicle 100 does not have an actual transmission, engine braking that is applied in the manual mode is virtual engine braking that is simulated by regenerative braking. Hereinafter, engine braking that is virtually implemented by regenerative braking will be referred to as "virtual engine braking."

FIG. 6 shows a process related to application of virtual engine braking by the controller 101. The process related to application of virtual engine braking includes a process P151 of determining whether to apply virtual engine braking, and a process P152 of applying regenerative braking. These processes are performed by the controller 101 functioning as a driving control device.

In the process P151, determination is made as to whether to apply engine braking. The controller 101 applies virtual engine braking when the battery electric vehicle 100 is traveling with the manual mode selected and there is no accelerator operation input. Whether the manual mode is selected is acquired from a control mode signal received from the HMI 20. Whether there is an accelerator operation input, that is, whether the accelerator pedal 22 is being depressed by the driver, is acquired from a signal from the accelerator pedal stroke sensor 12. Whether the battery electric vehicle 100 is traveling can be acquired from a signal from the vehicle speed sensor 11. When the vehicle speed is not zero, the battery electric vehicle 100 is determined to be traveling. When it is determined based on the signals acquired from the HMI 20, the vehicle speed sensor 11, and the accelerator pedal stroke sensor 12 that the battery electric vehicle 100 is traveling in the manual mode and the accelerator pedal 22 is not being depressed, the controller 101 determines to apply virtual engine braking.

When it is determined that virtual engine braking is to be applied, the controller 101 performs the process P152. In the process P152, the electric motors 4F, 4R are controlled so as to convert the torque input from the front drive shafts 5F and the rear drive shafts 5R to regenerative electric power to apply regenerative braking. The strength of regenerative braking is determined according to the virtual shift position. Engine braking of a manual transmission internal combustion engine vehicle is replicated by the application of regenerative braking.

Replicating the engine braking in this manner can make the behaviors of the battery electric vehicle 100 closer to those of a real manual transmission internal combustion engine vehicle. However, unlike engine braking in an actual manual transmission internal combustion engine vehicle, the use of regenerative braking may be restricted depending on the state of the battery 2. Specifically, when the charge accepting capacity of the battery 2 is insufficient, there is not enough space to store the regenerative electric power generated by regenerative braking, and therefore the use of regenerative braking is restricted.

The larger the gear ratio, the stronger the engine braking is applied. In order to replicate engine braking in the manual mode of the battery electric vehicle 100, regenerative braking is applied in such a manner that the larger the virtual gear ratio, the stronger the regenerative braking is applied. In other words, when the virtual gear ratio is small, engine braking can be replicated without applying strong regenerative braking. The virtual gear ratio increases as the virtual shift position is moved to a downshift side. Therefore, the battery electric vehicle 100 gives the driver a notification regarding virtual shift positions when the charge accepting capacity is, or is predicted to be, insufficient in the manual mode. Specific examples of the notification that is given to the driver will be described below. In the following description, it is assumed that the virtual shift positions are six gears, namely first to sixth gears. However, a notification is also given in the same manner when the number of virtual shift positions is more than six or less than six.

6-2. Situation Where Virtual Engine Braking is Used

FIG. 7 shows a situation where the battery electric vehicle 100 is traveling on a mountain road 200 that has a continuous downhill, as an example of a situation where virtual engine braking is expected to be used frequently.

The charge accepting capacity of the battery 2 is sufficiently large at the time (a) when the battery electric vehicle 100 is approaching the mountain road 200. When the battery electric vehicle 100 enters the mountain road 200, the driver shifts down the virtual shift position and starts applying virtual engine braking in order to reduce the use of the brake pedal 23.

For a while after the driver started traveling on the mountain road 200, the charge accepting capacity is large enough that virtual engine braking can be used regardless of the virtual shift position. No notification regarding shift positions is given to the driver during this time. Alternatively, the driver is notified that all shift positions are selectable.

As the virtual engine is used, charging of the battery 2 progresses. At the time (b), the charge accepting capacity starts to become small enough that virtual engine braking cannot be used in first gear. At this time, a notification prompting to select a shift position on the upshift side with respect to first gear, that is, a shift position of second or higher gear, is given to the driver. The driver shifts the shift position to second or higher gear according to the notification, so that virtual engine braking can still be used.

As charging of the battery 2 further progresses, the charge accepting capacity further decreases, and starts to become small enough that virtual engine braking cannot be used in second gear. At this time, a notification prompting to select a shift position of third or higher gear is given to the driver. The driver shifts the shift position to third or higher gear according to the notification, so that virtual engine braking can still be used.

This operation continues in the same manner. As charging of the battery 2 further progresses and the charge accepting capacity further decreases, the driver is notified to select a shift position according to the charge accepting capacity, for example at time (c) and time (d).

6-3. First Process Example

FIG. 8 is a flowchart showing an example of a process that is performed by the controller 101. For example, the series of steps shown in FIG. 8 is repeatedly performed at a predetermined control cycle while the battery electric vehicle 100 is on. The series of steps is implemented by the processor 102 executing the program 104.

According to the flowchart shown in FIG. 8, it is first determined in step S101 whether virtual engine braking is in effect. When virtual engine braking is not in effect, the series of steps ends.

In step S101, the controller 101 may determine whether the battery electric vehicle 100 is in a situation where virtual engine braking is used, such as a situation where the battery electric vehicle 100 is traveling on a mountain road that has a continuous downhill, rather than determining whether virtual engine braking is merely temporarily in effect. The situation where virtual engine braking is used herein refers to a situation where virtual engine braking is expected to be used somewhat continuously. The controller 101 may determine that the battery electric vehicle 100 is in a situation where virtual engine braking is used, when virtual engine braking has been continuously applied for a predetermined period of time or more, or when the frequency of applying virtual engine braking within a certain period of time is a predetermined value or more.

When virtual engine braking is in effect, step S102 is performed. In step S102, it is determined whether the charge accepting capacity of the battery 2 is less than a predetermined value S1. The predetermined value S1 is a lower limit of the charge accepting capacity at which virtual engine braking can be applied even when the virtual shift position is first gear. The controller 101 acquires the charge accepting capacity from a signal received from the battery management system 10. When the charge accepting capacity is equal to or greater than the predetermined value S1, the series of processes ends.

When the charge accepting capacity is less than the predetermined value S1, step S103 is performed. In step S103, it is determined whether the charge accepting capacity is less than a predetermined value S2. The predetermined value S2 is a lower limit of the charge accepting capacity at which virtual engine braking can be applied when the virtual shift position is second or higher gear. The predetermined value S2 is smaller than the predetermined value S1.

When the charge accepting capacity is equal to or greater than the predetermined value S2, step S104 is performed. In step S104, a notification prompting to select a shift position of second or higher gear is given to the driver. The notification is given by the HMI 20 displaying selectable shift positions on the touch panel display. Alternatively, the notification may be given by voice via the in-vehicle speaker 21.

When the charge accepting capacity is less than the predetermined value S2, step S105 is performed. In step S105, it is determined whether the charge accepting capacity is less than a predetermined value S3. The predetermined value S3 is a lower limit of the charge accepting capacity at which virtual engine braking can be applied when the virtual shift position is fourth or higher gear. The predetermined value S3 is smaller than the predetermined value S2.

When the charge accepting capacity is equal to or greater than the predetermined value S3, step S106 is performed. In step S106, a notification prompting to select a shift position of fourth or higher gear is given to the driver. The notification is given by display or voice.

When the charge accepting capacity is less than the predetermined value S3, step S107 is performed. In step S107, a notification prompting to shift the shift position to sixth gear is given to the driver. The notification is given by display or voice.

As described above, while the battery electric vehicle 100 is in the manual mode and is decelerating using virtual engine braking, the battery electric vehicle 100 requests the driver to select a shift position according to the charge accepting capacity. More specifically, regarding the threshold of the charge accepting capacity set for each shift position, the battery electric vehicle 100 determines whether the current charge accepting capacity is less than the threshold. When the current charge accepting capacity is less than the threshold set for any one of the shift positions, the driver is notified to select a shift position on the upshift side with respect to this shift position. At this time, when a plurality of shift positions is selectable, the driver is notified of these shift positions, as in steps S104, S106. The threshold for each shift position need not necessarily be set for all of the shift positions. The above example illustrates the case where notification is given in three stages to prompt the driver to select a shift position of second or higher gear, fourth or higher gear, or sixth gear. Alternatively, notification regarding the selectable shift positions may be given in more stages than in the above example. That is, in addition to the above notifications, a notification prompting to select a shift position of third or higher gear and/or a notification prompting to select a shift position of fifth or higher gear may be given to the driver.

6-4. Effects

According to the above process, when the charge accepting capacity of the battery 2 decreases, a notification prompting to keep the virtual shift position on the upshift side is given to the driver. Selecting a shift position on the upshift side reduces the strength of virtual engine braking and the frequency of using virtual engine braking, so that engine braking can be replicated even when the charge accepting capacity is small. As described above, even when the charge accepting capacity of the battery 2 decreases, the manual mode can be continued without compromising an operation feel like a manual transmission internal combustion engine vehicle. This can increase the satisfaction of a driver who wants to experience a more realistic feeling of operating a manual transmission internal combustion engine vehicle. The above configuration is particularly effective in situations where a large amount of regenerative power is expected to be generated due to frequent use of virtual engine braking, such as on a downhill.

6-5. Second Process Example

FIG. 9 is a flowchart showing another example of the process that is performed by the controller 101. For example, the series of steps shown in FIG. 9 is repeatedly performed at a predetermined control cycle while the battery electric vehicle 100 is on. The series of steps is implemented by the processor 102 executing the program 104.

According to the flowchart shown in FIG. 9, it is first determined in step S201 whether virtual engine braking is in effect. When virtual engine braking is not in effect, the series of steps ends.

In step S201, the controller 101 may determine whether the battery electric vehicle 100 is in a situation where virtual engine braking is used. In this case, when the battery electric vehicle 100 is not in a situation where virtual engine braking is used, the series of steps ends. When the battery electric vehicle 100 is in a situation where virtual engine braking is used, the process proceeds to step S202.

When virtual engine braking is in effect, step S202 is performed. In step S202, it is determined whether the charge accepting capacity of the battery 2 is less than a predetermined value. The predetermined value may be the same as the predetermined value S1 in step S102, or may be smaller than the predetermined value S1. When the charge accepting capacity is equal to or greater than the predetermined value, the series of steps ends.

The determination in step S202 may be made based on the SOC. In this case, when the SOC is equal to or lower than a predetermined value, the series of steps ends. When the SOC is greater than the predetermined value, the process proceeds to step S203.

When the charge accepting capacity is less than the predetermined value, step S203 is performed. In step S203, the controller 101 requests the driver not to shift down. For example, the controller 101 causes a message such as "downshifting will be restricted" to be displayed on the HMI 20.

As described above, the controller 101 may request the driver not to shift down when the charge accepting capacity becomes equal to or less than the predetermined value. In this case, as in the first process example, the virtual shift position is kept on the upshift side. This reduces the strength of virtual engine braking and the frequency of applying virtual engine braking, so that engine braking can be replicated by regenerative braking even when the charge accepting capacity is small. It is therefore possible to maintain an operation feel as if the driver were operating an actual manual transmission internal combustion engine vehicle, regardless of the charge accepting capacity.

6-6. Modifications

In the flow of FIG. 9, a plurality of thresholds may be set for the charge accepting capacity, and a minimum allowable shift position may be set for each threshold. For example, fourth gear may be set as a minimum shift position for a first threshold of the charge accepting capacity. In this case, a request not to shift down to third or lower gear may be made when the charge accepting capacity is less than the first threshold. Third gear may be set as a minimum shift position for a second threshold smaller than the first threshold. In this case, a request not to shift down to second or lower gear may be made when the charge accepting capacity is less than the second threshold.

In step S202 of the flow of FIG. 9, it may be determined whether there is an abnormality in the battery 2. When there is no abnormality in the battery 2, the series of steps ends. When there is an abnormality in the battery 2, the process proceeds to step S203. The battery 2 may not be able to receive regenerative power when there is an abnormality in the battery 2. Even in such a case, the frequency of using virtual engine braking can be reduced by prompting the driver to keep the virtual shift position on the upshift side. It is therefore possible to maintain an operation feel like an actual manual transmission internal combustion engine vehicle.

The controller 101 may reduce the charge accepting capacity of the battery 2 in advance according to prediction of the amount of regenerative power to be generated. For example, the controller 101 communicate with a navigation system to acquire in advance a planned travel route of the battery electric vehicle 100. When the planned travel route of the battery electric vehicle 100 includes a section that has a continuous downhill, the battery 2 may be discharged to reduce the charge level before the battery electric vehicle 100 reaches the section that has a continuous downhill.

What is claimed is:

1. A battery electric vehicle that includes an electric motor as a driving source, the battery electric vehicle comprising:
    a driving operation member that is used to drive the battery electric vehicle;
    a pseudo shifting operation member imitating an operation member that is used to perform a shifting operation of a manual transmission internal combustion engine vehicle;
    a processor that controls the battery electric vehicle according to operation of the driving operation member; and
    an in-vehicle battery that is charged with electrical energy generated when regenerative braking of the battery electric vehicle is applied, wherein:
    the processor is configured to execute, according to selection by a driver, a control mode in which operation of the pseudo shifting operation member is associated with torque of the electric motor, and
    in the control mode, the processor is configured to:
        determine virtual shift positions based on the operation of the pseudo shifting operation member,
        when the battery electric vehicle is traveling and there is no accelerator operation input, apply the regenerative braking with a strength according to the virtual shift positions, notify the driver of the battery electric vehicle of a shift position according to a charge accepting capacity of the in-vehicle battery, a threshold of the charge accepting capacity is set for each of the virtual shift positions, and the processor is configured to:

when the control mode is being executed and the regenerative braking with the strength according to the virtual shift positions is being applied, determine whether the charge accepting capacity is less than the threshold, and when the charge accepting capacity is less than the threshold set for a first virtual shift position among the virtual shift positions, notify the driver of a shift position on an upshift side with respect to the first virtual shift position.

2. The battery electric vehicle according to claim 1, wherein the processor is configured to, when a plurality of shift positions is on the upshift side of the first virtual shift position, notify the driver of the plurality of shift positions.

3. The battery electric vehicle according to claim 1, wherein the processor is configured to when the control mode is being executed and the regenerative braking with the strength according to the virtual shift positions is being applied, determine whether the charge accepting capacity is less than a predetermined amount, and when the charge accepting capacity is less than the predetermined amount, request the driver not to shift down.

4. The battery electric vehicle according to claim 3, wherein the processor is configured to determine that the charge accepting capacity is less than the predetermined amount when a state of charge of the in-vehicle battery is equal to or greater than a predetermined value or when there is an abnormality in the in-vehicle battery.

5. The battery electric vehicle according to claim 1, wherein:

the driving operation member includes an accelerator pedal; and the pseudo shifting operation member includes a pseudo H-shifter imitating an H-shifter of a manual transmission, and a pseudo clutch operation device imitating a clutch operation device.

6. The battery electric vehicle according to claim 5, wherein the processor is configured to change the torque of the electric motor according to a shift position selected by the pseudo H-shifter, an amount of operation of the pseudo clutch operation device, and an amount of operation of the accelerator pedal, when in the control mode.

7. The battery electric vehicle according to claim 1, wherein:

the driving operation member includes an accelerator pedal; and the pseudo shifting operation member includes a pseudo sequential shifter imitating a sequential shifter of a manual transmission.

8. The battery electric vehicle according to claim 7, wherein the processor is configured to change the torque of the electric motor according to a shift position selected by the pseudo sequential shifter and an amount of operation of the accelerator pedal, when in the control mode.

9. The battery electric vehicle according to claim 1, wherein:

the driving operation member includes an accelerator pedal; and the pseudo shifting operation member includes a pseudo H-shifter imitating an H-shifter of a manual transmission.

10. The battery electric vehicle according to claim 9, wherein the processor is configured to change the torque of the electric motor according to a shift position selected by the pseudo H-shifter and an amount of operation of the accelerator pedal, when in the control mode.

11. A battery electric vehicle that includes an electric motor as a driving source, the battery electric vehicle comprising:

a driving operation member that is used to drive the battery electric vehicle;

a pseudo shifting operation member imitating an operation member that is used to perform a shifting operation of a manual transmission internal combustion engine vehicle;

a processor that controls the battery electric vehicle according to operation of the driving operation member; and an in-vehicle battery that is charged with electrical energy generated when regenerative braking of the battery electric vehicle is applied, wherein:

the processor is configured to execute, according to selection by a driver, a control mode in which operation of the pseudo shifting operation member is associated with torque of the electric motor, in the control mode, the processor is configured to:

determine virtual shift positions based on the operation of the pseudo shifting operation member, when the battery electric vehicle is traveling and there is no accelerator operation input, apply the regenerative braking with a strength according to the virtual shift positions, notify the driver of the battery electric vehicle of a shift position according to a charge accepting capacity of the in-vehicle battery, and the processor is configured to execute:

when the control mode is being executed and the regenerative braking with the strength according to the virtual shift positions is being applied, determine whether the charge accepting capacity is less than a predetermined amount, and when the charge accepting capacity is less than the predetermined amount, request the driver not to shift down.

12. The battery electric vehicle according to claim 11, wherein the processor is configured to determine that the charge accepting capacity is less than the predetermined amount when a state of charge of the in-vehicle battery is equal to or greater than a predetermined value or when there is an abnormality in the in-vehicle battery.

* * * * *